US012386235B2

United States Patent
Cocchini et al.

(10) Patent No.: US 12,386,235 B2
(45) Date of Patent: Aug. 12, 2025

(54) ELECTROCHROMIC OPTICAL SWITCH

(71) Applicant: International Business Machines Corporation, Armonk, NY (US)

(72) Inventors: Matteo Cocchini, New York, NY (US); Faezeh Gholami, Ridgewood, NJ (US); Michael Cracraft, Poughkeepsie, NY (US); Vahe Minassian, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 17/380,698

(22) Filed: Jul. 20, 2021

(65) Prior Publication Data
US 2023/0024042 A1    Jan. 26, 2023

(51) Int. Cl.
*G02F 1/31* (2006.01)
*C01G 41/02* (2006.01)
*C09K 9/00* (2006.01)

(52) U.S. Cl.
CPC ............ *G02F 1/31* (2013.01); *C01G 41/02* (2013.01); *C09K 9/00* (2013.01); *C01P 2006/40* (2013.01);
(Continued)

(58) Field of Classification Search
CPC .... G02F 1/31; G02F 2201/02; G02F 2201/05; C01G 41/02; C09K 9/00; C01P 2006/40; C01P 2006/60
See application file for complete search history.

(56) References Cited

U.S. PATENT DOCUMENTS

| | | |
|---|---|---|
| 3,492,493 A | 1/1970 | Herriott et al. |
| 3,635,544 A | 1/1972 | Stamm et al. |

(Continued)

FOREIGN PATENT DOCUMENTS

| | | | |
|---|---|---|---|
| EP | 2235512 A | | 10/2010 |
| JP | 2001174654 A | * | 6/2001 |

(Continued)

OTHER PUBLICATIONS

Fiber Optic Components (The Advantages and Disadvantages of Multimode Fiber and Single Mode Fiber Cable. May 27, 2014, retrieved Apr. 30, 2024. Retrieved from: https://www.fiber-optic-components.com/the-advantages-and-disadvantages-of-multimode-and-single-mode-fiber.html (Year: 2014).*

(Continued)

*Primary Examiner* — Bumsuk Won
*Assistant Examiner* — Ray Alexander Dean
(74) *Attorney, Agent, or Firm* — Kelsey Skodje

(57) ABSTRACT

A device, a method, and an article of manufacture are disclosed. The device includes a first optical fiber, a second optical fiber, an electrochromic component positioned between tips of the optical fibers, and a voltage source connected to the electrochromic component. The method includes providing an electrochromic component, providing optical fibers and a voltage source, and assembling an optical switch that includes the electrochromic component, the optical fibers, and the voltage source. The voltage source is connected to the electrochromic component. The article of manufacture includes an optical switch with a voltage source connected to an electrochromic component positioned between optical fiber tips.

20 Claims, 3 Drawing Sheets

(52) U.S. Cl.
CPC ...... *C01P 2006/60* (2013.01); *G02F 2201/02* (2013.01); *G02F 2201/05* (2013.01)

(56) References Cited

U.S. PATENT DOCUMENTS

| | | | |
|---|---|---|---|
| 4,245,883 | A | 1/1981 | Johnson et al. |
| 4,303,302 | A | 12/1981 | Ramsey et al. |
| 4,505,539 | A * | 3/1985 | Auracher ............... G02F 1/3131 359/228 |
| 5,091,984 | A | 2/1992 | Kobayashi et al. |
| 5,970,187 | A | 10/1999 | Notten et al. |
| 6,636,653 | B2 | 10/2003 | Miracky et al. |
| 6,636,664 | B2 | 10/2003 | Snyder et al. |
| 6,906,842 | B2 | 6/2005 | Agrawal et al. |
| 8,736,942 | B2 | 5/2014 | Risser et al. |
| 11,187,858 | B2 | 11/2021 | Gholami et al. |
| 2002/0090192 | A1* | 7/2002 | O'Brien ................ G02F 1/157 385/9 |
| 2008/0150555 | A1 | 6/2008 | Wang et al. |
| 2018/0238517 | A1* | 8/2018 | Friszell ................ G02F 1/157 |
| 2021/0198564 | A1 | 7/2021 | Goto et al. |
| 2021/0271032 | A1* | 9/2021 | Gholami ............. G02B 6/4403 |

FOREIGN PATENT DOCUMENTS

| | | |
|---|---|---|
| WO | 03001260 A1 | 1/2003 |
| WO | 2010120257 W | 10/2010 |

OTHER PUBLICATIONS

Djaoued et al., "Electrochromic Devices Based on Porous Tungsten Oxide Thin Films," Hindawi Publishing Corporation, Journal of Nanomaterials, vol. 2012, Article ID 674168, 9 pages, doi: 10.1155/2012/674168.

Jeong et al., "Enhanced black state induced by spatial silver nanoparticles in an electrochromic device," https://www.nature.com/articles/am201725, NPG Asia Materials (2017) 9, e362; DOI: https://doi.org/10.1038/am.2017.25, 8 pgs.

Liang et al., "High-performance flexible electrochromic device based on facile semiconductor-to-metal transition realized by WO3 2H2O ultrathin nanosheets," Scientific Reports | 3: 1936 | DOI: 10.1038/step01936, https://www.nature.com/articles/srep01936 , 8 pgs.

Liu et al., "Highly transparent to truly black electrochromic devices based on an ambipolar system of polyamides and viologen," NPG Asia Materials (2017) 9, e388, DOI: 10/1038/am.2017.57.

Runnerstrom et al., "Nanostructured electrochromic smart windows: traditional materials and NIR-selective plasmonic nanocrystals," Royal Society of Chemistry, Chem. Commun., 2014, 50, 10555-10572, Jun. 4, 2014, DOI: 10/1039/c4cc03109a.

Wang et al., "All-solid-state electrochromic device integrated with near-IR blocking layer for image sensor and energysaving glass application," Appl. Phys. Lett. 109, 123501 (2016); https://doi.org/10.1063/1.4962842, 1 pg.

Wang et al., "The improvement of all-solid-state electrochromic devices fabricated with the reactive sputter and cathodic arc technology," AIP Advances 6, 115009 (2016), https://doi.org/10.1063/1.4967363.

Wu et al., "Flexible Electrochromic V O Thin Films with Ultrahigh Coloration Efficiency on Graphene Electrodes," https://iopscience.iop.org/article/10.1149/2.0481805jes, J. Electrochem. Soc. 165 D183 (abstract only), 1pg., 2018.

International Search Report and Written Opinion, Application No. PCT/CN2022/099131, Sep. 14, 2022, 8 pgs.

* cited by examiner

ELECTROCHROMIC OPTICAL SWITCH

BACKGROUND

The present disclosure relates to optoelectronic devices and, more specifically, to electrochromic materials for optical switches.

Optical switches, or optical transistors, are devices that selectively allow passage of light through optical fibers. Optical switches can also be used to adjust the intensity of light radiating through optical fibers (e.g., amplifying a signal). Applications for optical switches can include fiber-optic communication networks, optical digital signal processing, photonic integrated circuits, and quantum information processing.

SUMMARY

Various embodiments are directed to a device that includes a first optical fiber, a second optical fiber, an electrochromic component positioned between tips of the optical fibers, and a voltage source connected to the electrochromic component. The device can also include a third optical fiber and a second electrochromic component positioned between a second tip of the second optical fiber and a tip of the third optical fiber. The second electrochromic component can be connected to the voltage source. In some embodiments, the first and second optical fibers are multimode optical fibers. The electrochromic component can include a first transparent conductive layer in contact with an electrochromic layer, an ion transfer layer in contact with the electrochromic layer and a counterelectrode, and a second transparent conductive layer in contact with the counterelectrode. The electrochromic layer can include a transition metal oxide such as anhydrous tungsten oxide or a tungsten oxide hydrate. The device can also include a mechanical enclosure. In some embodiments, the device has a voltage control component.

Additional embodiments are directed to a method that includes providing an electrochromic component, providing optical fibers and a voltage source, and assembling an optical switch that includes the electrochromic component, the optical fibers, and the voltage source. The voltage source is connected to the electrochromic component. The method can also include operating the optical switch. Operating the optical switch can include applying a voltage to the electrochromic component. The electrochromic component can be positioned between tips of the optical fibers. Providing the electrochromic component can include providing an electrochromic material, such as a transition metal oxide. In some embodiments, providing the electrochromic material includes forming a nanosheet of a transition metal oxide. In other embodiments, providing the electrochromic material includes forming a thin film of a transition metal oxide.

Further embodiments are directed to an article of manufacture that includes an optical switch. The optical switch includes a first optical fiber, a second optical fiber, an electrochromic component positioned between tips of the optical fibers, and a voltage source connected to the electrochromic component. The optical switch can also include a third optical fiber and a second electrochromic component positioned between a second tip of the second optical fiber and a tip of the third optical fiber. In some embodiments, the electrochromic component includes a transition metal oxide.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
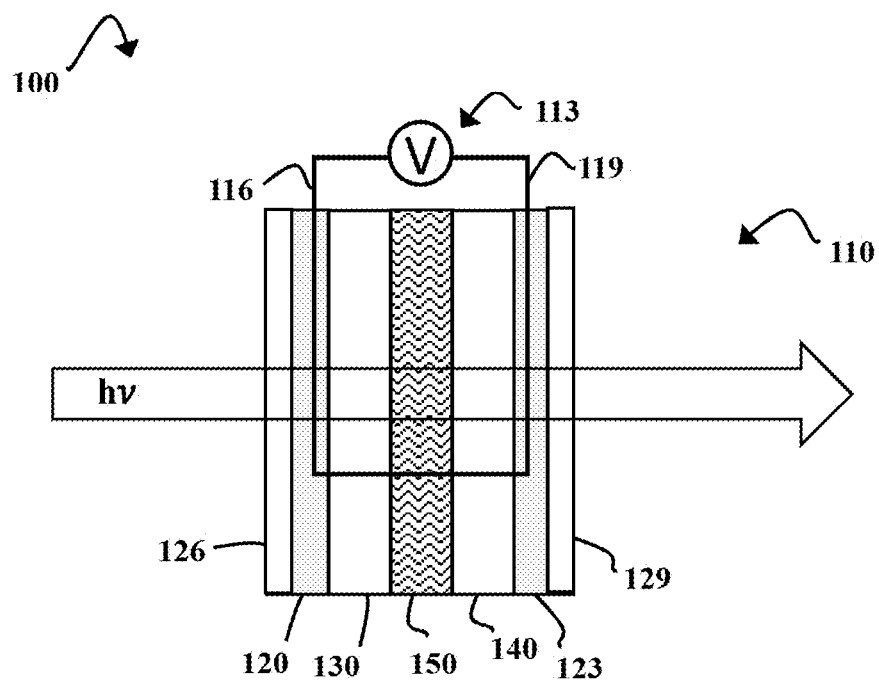
FIGS. 1A and 1B are schematic diagrams illustrating an electrochromic component of an optical switch in a bleached state and a colored state, according to some embodiments of the present disclosure.

While the invention is amenable to various modifications and alternative forms, specifics thereof have been shown by way of example in the drawings, and will be described in detail. It should be understood, however, that the intention is not to limit the invention to the particular embodiments described. Instead, the intention is to cover all modifications, equivalents, and alternatives falling within the spirit and scope of the invention.

DETAILED DESCRIPTION

Optical switches, or optical transistors, are devices that selectively allow or adjust passage of light through optical fibers or other optical waveguides. Applications for optical switches can include fiber-optic communication networks, optical digital signal processing, photonic integrated circuits, and quantum information processing. Categories of optical switches that have traditionally been used in fiber optic communication networks include lens-based switches, actuator switches, and micro-electromechanical system (MEMS) switches. Lens-based switches can use a Risley prism pair controlled by a computer to steer light radiating from a fiber in an input bundle into a selected fiber in an output bundle. Actuator switches can be controlled by moving components, such as mirrors, in order to steer light. MEMS devices can use micro-lenses integrated with actuators to form MEMS lens assemblies for optical switching. However, each of these designs includes a number of moving parts that must be precisely aligned and realigned in order to operate reliably. This introduces opportunities for alignment errors and damage caused by corrosion, abrasion, introduction of debris, etc. Therefore, optical switches with fewer components and a more simple design could offer advantages such as greater reliability and durability.

Disclosed herein are optical switches that use electrochromic components, such as electrochromic glass, to control the transmission of light (electromagnetic (EM) radiation) through optical waveguides (e.g., optical fibers). The light transmittance of an electrochromic material reversibly changes in response to an applied voltage. The applied voltage can be a direct current (DC) voltage below about 5 V (e.g., approximately 0.5 V-3.3 V). Herein, an electrochromic material/component is referred to as being in its "bleached" state when it is at its maximum transmittance for a given region of the EM spectrum (e.g., infrared) and in its "colored" state when it is at its minimum transmittance for the given region. The optical switch can include an electrochromic component connected to a voltage source and positioned in between two optical fibers. The switch can be "turned off" by applying a voltage sufficient for producing the colored state in the electrochromic material (thereby blocking light transmission) and "turned on" by reversing the voltage so that the electrochromic material returns to its bleached state.

Figure 1B:
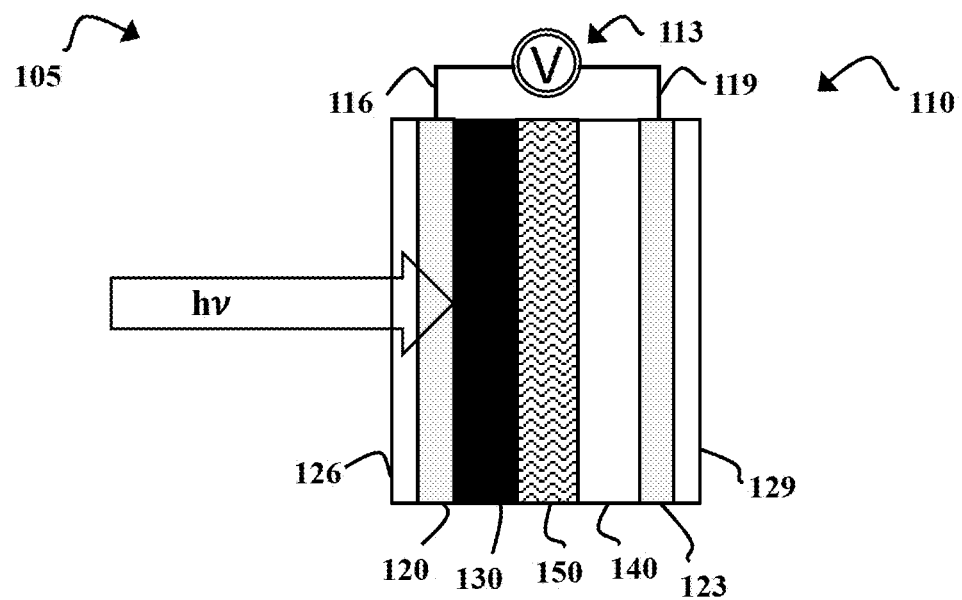
Figure 2A:
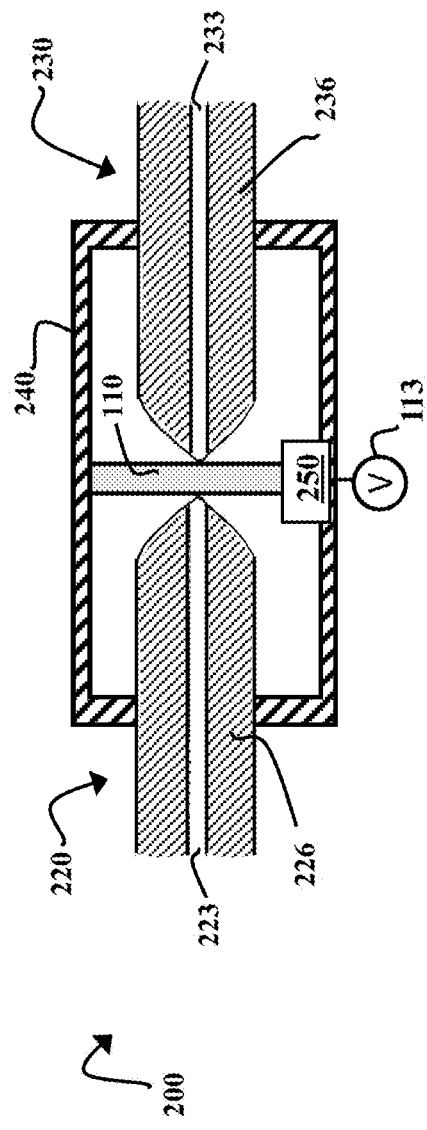
FIGS. 2A and 2B are schematic diagrams illustrating cross-sectional views of optical switches containing electrochromic components, according to some embodiments of the present disclosure.
Figure 2B:
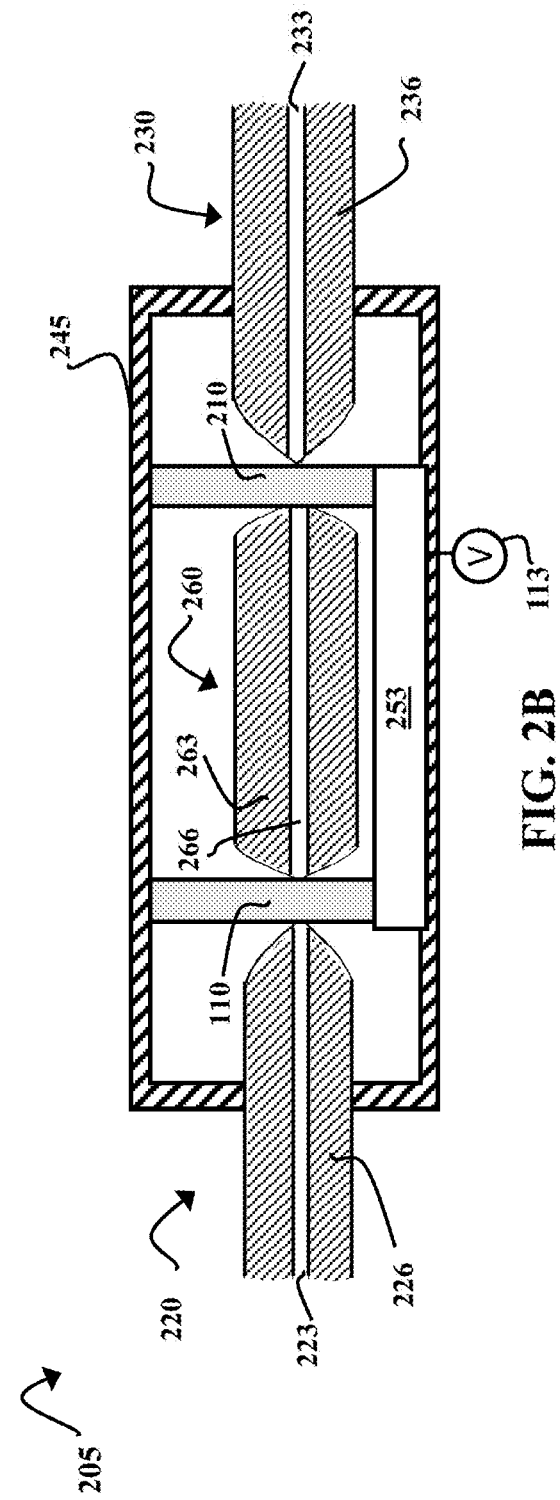

FIGS. 1A and 1B are schematic diagrams illustrating an electrochromic (EC) component 110 of an optical switch in a bleached state 100 and a colored state 105, according to some embodiments of the present disclosure. To illustrate these examples, but not to limit embodiments, the same reference numbers are used where elements shown in FIG. 1A are identical to elements shown in FIG. 1B. FIGS. 1A and 1B also illustrate a voltage source 113. Optical fibers and additional components of optical switches are illustrated in FIGS. 2A and 2B.

The voltage source 113 (e.g., a lithium ion battery, solar cell, external power supply, etc.) is connected via electrical connections 116 and 119 to conductive layers 120 and 123. In some embodiments, conductive layers 120 and 123 each include a transparent conductive film (TCF) on a transparent substrate 126 and 129 (e.g., glass, plastics such as polyethylene terephthalate (PET), silicon, etc.). In some embodiments, the TCF is a transparent conductive oxide such as indium tin oxide (ITO), aluminum-doped zinc oxide (AZO), fluorine-doped tin oxide (FTO), etc. However, any appropriate TCF can be used (e.g., conductive polymers, carbon nanotubes, graphene, nanowire mesh, metal grids, ultra-thin metal films, etc.). Additionally, in some embodiments, conductive layer 120 or 123 is a TCF with no additional transparent substrate. For example, conductive layer 120 may be a TCF deposited on layer 130 and substrate 126 may be omitted.

An EC layer 130 is positioned in contact with conductive layer 120, and a counterelectrode 140 is positioned in contact with conductive layer 123. However, these positions can be reversed so that counterelectrode 140 is in contact with conductive layer 120 and EC layer 130 is in contact with conductive layer 123. The EC layer 130 includes an EC material, also referred to as an electrochrome. Examples of electrochromes that may be used can include anhydrous tungsten oxide ($WO_3$), a tungsten oxide hydrate (e.g., $WO_3 \cdot 2H_2O$, $WO_3 \cdot 0.5H_2O$, or $WO_3 \cdot 0.33H_2O$), other electrochromic transition metal oxides (e.g., $MoO_3$, $V_2O_5$, $TiO_2$, $Nb_2O_5$, $Ta_2O_5$, $NiO$, $IrO_2$, etc.), a mixed electrochromic transition metal oxide (e.g., Ni—V oxide, W—Mo oxide, etc.). In some embodiments, dopants (e.g., lithium, tin oxide, antimony oxide, etc.) are included in the EC material. Other electrochromes that may be used can include electrochromic organometallic compounds (e.g., ruthenium-2,2'-bipyridine), redox-active polymers such as poly[3,4-ethylenedioxythiophene] (PEDOT) or polyaniline, viologens, etc.

The EC layer 130 can be prepared by depositing the EC material on conductive layer 120 as a thin film (e.g., via sputtering, spin-coating, etc.). The thin film can have a thickness of about 1 nm-500 nm in some embodiments. However, thin films above or below this range can be used in other embodiments. The EC layer 130 can also be prepared with other EC material morphologies. For example, the EC material can be a crystalline or amorphous solid. The EC material can also be nanostructured (e.g., nanoparticles, nanorods, nanosheets, etc.) or incorporated into nanostructures. For example, the EC layer 130 can have two-dimensional (2D) nanosheets of a transition metal oxide (e.g., 1 atom-thick sheets of $WO_3 \cdot 2H_2O$). In some instances, a flexible EC component 110 can be prepared. For example, the conductive layers 120 and 123 can be made of ITO on PET, and the EC layer 130 and counterelectrode 140 can be made of 2D nanosheets or other ultra-thin materials.

The counterelectrode 140 includes a transparent layer of an ion-storing material deposited on the conductive layer 123, opposite the EC layer 130. The counterelectrode 140 can have a structure similar to the EC layer 130, such as a thin film, a nanosheet or other nanostructure, etc. In some embodiments, the counterelectrode 140 includes an optically passive oxide, such as $CeO_2$, $CeVO_4$, or $SnO_2$. These materials do not change color in response to redox changes and remain transparent when the EC layer 130 is in its bleached and colored states. This is discussed in greater detail below.

An ion transport layer 150 is positioned between the EC layer 130 and counterelectrode 140. The ion transport layer 150 can include a transparent liquid or solid electrolyte. There can be a sealant (not shown) such as a curable epoxy resin or solder glass around the edges of the EC component 110 to protect it from environmental contaminants and, when the ion transport layer 150 contains a liquid electrolyte, prevent the solution from leaking out of the EC component 110. Liquid electrolytes can include salts such as lithium iodide, viologen salts, $NaCF_3SO_3$, $NH_4BF_4$, $LiClO_4$, $LiAsF_6$, $LiBF_4$, $LiCF_3SO_3$, etc. dissolved in solvents such as tetraglyme, propylene carbonate, ethylene carbonate, γ-butyrolactone, sulfolane, acetonitrile or other nitrile solvents, etc. The electrolyte may also include additives such as UV stabilizers, viscosity modifiers, polymerizing agents, redox promoters, etc.

The ion transport layer 150, like conductive layers 120 and 123 and the counterelectrode 140, can be a transparent material. It should be noted that, herein, "transparent" refers to materials that are transparent to EM radiation at wavelengths transmitting through the EC component 110 (e.g., about 400 nm-1500 nm, about 700 nm-2000 nm, etc.). However, the transparent materials can be translucent or opaque to EM radiation at other wavelengths (e.g., below ~400 nm, below ~10 nm, etc.) in some embodiments.

FIG. 1B illustrates the EC component 110 when a voltage has been applied, via the voltage source 113 and connectors 116 and 119, to conductive layers 120 and 123. The voltage source 113 can be a direct current (DC) voltage source such as a battery or other DC power supply. In some embodiments, the applied voltage is a value between approximately ±0.5 V-±5 V (e.g., ±3.3 V, ±2.5 V, etc.). The applied voltage causes a redox change in the EC layer 130 that transitions the EC component 110 into its colored state 105. When this voltage is reversed, the EC layer 130 redox change is reversed, and the EC component 110 can return to its bleached state 100. The EC layer 130 can have a cathodically or anodically coloring electrochrome. Cathodically coloring electrochromes (e.g., $WO_3$, $MoO_3$, $TiO_2$, $Nb_2O_5$, and $Ta_2O_5$,) become colored upon positive charge injection (oxidation), and anodically coloring electrochromes (e.g., $NiO$, $IrO_2$, $V_2O_5$, viologens, ruthenium-2,2'-bipyridine, and PEDOT) become colored upon negative charge injection (reduction).

When the EC component 110 is in its bleached state 100 (FIG. 1A), maximum light (hv) transmission is allowed through EC layer 130. When the EC component 110 is in its colored state 105 (FIG. 1B), minimum light (hv) transmission is allowed through the EC layer 130. The percent transmittance of EC layer 130 can depend on the type of electrochrome and the applied voltage, etc. For example, when a given EC component 110 is in its bleached state 100, its EC layer 130 may have a percent transmittance of about 10% at +2.5 V and, when the same EC component 110 is in its colored state 105, its EC layer 130 may have a percent transmittance of about 90% at −2.5 V. However, at different voltages (e.g., ±1.5 V) the transmittances of this EC layer 130 may be, respectively, ~20% and ~80%.

The amount of light transmission can also depend on the wavelength of light. For example, the EC component 110 in its bleached state 100 may maximally transmit EM radiation of about 700 nm-2000 nm. However, the EC component 110 in both its bleached 100 and colored states 105 can be translucent or opaque to EM radiation at other wavelengths (e.g., below ~400 nm, below ~10 nm, etc.) in some embodiments. In telecommunication applications, EM radiation at wavelengths of about 850 nm-900 nm, about 1300 nm-1310 nm, about 1510-1550 are commonly used. Therefore, an EC component 110 that absorbs infrared (IR) radiation in its colored state may be used. In addition, the maximum and minimum transmittance of a given EC component 110 may depend on the materials (e.g., type of counterelectrode 140) and structure (e.g. thickness and morphology) of layers 120-150, as will be understood by persons of ordinary skill in the art.

FIGS. 2A and 2B are schematic diagrams illustrating cross-sectional views of optical switches 200 and 205 containing electrochromic components, according to some embodiments of the present disclosure. To illustrate these examples, but not to limit embodiments, FIGS. 2A and 2B are described within the context of the EC component 110 illustrated in FIGS. 1A and 1B. Where elements shown in FIGS. 2A and 2B are identical to elements shown in FIGS. 1A and 1B, the same reference numbers are used in each figure. Similarly, the same reference numbers are used where elements shown in FIG. 2A are identical to elements shown in FIG. 2B.

FIG. 2A illustrates an optical switch 200 with an EC component 110 (FIGS. 1A and 1B) positioned between two optical fibers 220 and 230. Each of the optical fibers 220 and 230 includes a core 223 or 233 surrounded by a cladding 226 or 236. For simplicity, both optical fibers 220 and 230 are described with reference to optical fiber 220. However, the core 233 and cladding 236 of optical fiber 230 are substantially the same as the core 223 and cladding 226 of optical fiber 220 unless specified otherwise.

The core 223 can be a silica fiber, which can optionally have dopants such as $GeO_2$, $Al_2O_3$, fluorine, $B_2O_3$, etc. for adjusting the refractive index of the fiber. Other core 223 materials that may be used can include fluoride glass, phosphate glass, chalcogenide glass, poly(methyl methacrylate) (PMMA) and/or polystyrene (e.g., plastic optical fiber (POF)), etc. The core 223 diameter can depend on the type of optical fiber 220. In some embodiments, the core 223 diameter can be about 40 μm-100 μm (e.g., in a multi-mode optical fiber), about 5 μm-20 μm (e.g., in a single-mode optical fiber), about 800 μm-1000 μm (e.g., in a POF), etc.

The cladding 226 can be any appropriate material (e.g., plastics, silica or other glasses with optional dopants, etc.) having a lower refractive index than the core 223. While a single-layer cladding 226 is illustrated herein, the cladding 226 can have two or more layers in some embodiments (e.g., a double-clad fiber). Additionally, there can be protective layers (not shown) surrounding the cladding 226, such as at least one buffer layer (e.g., an acrylate polymer or polyimide coating) and, in some embodiments, a protective jacket/tube. The optical fiber 220 can be a multi-mode optical fiber (e.g. with a 62.5 μm diameter core 223 and, include the cladding 226, a 125 μm exterior diameter). However, the optical fiber 220 may be a single-mode optical fiber in other embodiments (e.g. with a 9 μm diameter core 223 and, include the cladding 226, a 125 μm exterior diameter).

In some embodiments, the optical fiber 220 has a lensed tip with a numerical aperture (NA) of 0.3. For example, the optical fiber 220 can be a multi-mode optical fiber with a lensed tip, a 62.5 μm diameter core, 125 μm exterior cladding diameter, and a 0.3 NA. In these instances, the maximum working distance from the tip may be about 30 μm. Lensed tips can have longer working distances than flat cleaved tips, as will be understood by persons of ordinary skill in the art. Herein, the "tips" of the optical fibers refer to the optical fiber ends facing the EC component 110 in the optical switch 200. The opposite ends (not shown) of optical fibers 220 and 230 can be attached (e.g., by standard optical fiber connectors or by splicing) to any appropriate unit such as an optical network terminal, a transmitter, a receiver, a splitter, an additional optical switch, etc. Sources of light transmitting through the optical fibers 220 and 230 can include light emitting diodes (LEDs), laser diodes, etc.

The optical switch 200 can include a mechanical enclosure 240 that maintains optical and mechanical alignment of the EC component 110 and optical fibers 220 and 230. Additional components of the optical switch 220, such as connectors 116 and 119 (FIGS. 1A and 1B) between the voltage source 113 and the EC component 110, can be supported and/or contained by the mechanical enclosure 240. In some embodiments, the optical fibers 220 and 230 can be attached to the mechanical enclosure 240 via any suitable standard optical fiber connector (not shown). The mechanical enclosure 240 can also prevent debris, ambient light, and other potential contaminants from damaging or interfering with the optical switch 200 components inside the enclosure 240. The mechanical enclosure 240 can be made of materials such as steel, aluminum, and plastics (e.g., acrylic, acrylonitrile butadiene styrene, acetal, etc.), or any other appropriate material.

The voltage controller 250 can control the timing, magnitude, and direction of voltage applied to the EC component 110 via the voltage source 113 and connectors 116 and 119 (illustrated in FIGS. 1A and 1B). The voltage controller 250 can be connected to a voltage source 113 such as a battery mounted on an interior or exterior surface of the mechanical enclosure 240. The voltage controller 250 can include electrical connections (not shown) to an internal or external power supply (voltage source 113) and circuitry for receiving and implementing instructions for controlling the optical switch 200 light transmission. This circuitry may be incorporated into the mechanical enclosure 240. The voltage controller 250 can also include components such as microprocessors, flash memory, etc.

The voltage controller 250 can be used to operate the switch 200 based on manually and/or automatically input instructions. Any techniques for controlling voltage applied to an electrochromic device known to those of ordinary skill in the art can be used. The voltage controller 250 may be controlled wirelessly in some embodiments. In some embodiments, the voltage controller 250 can be part of a device connected to the optical switch. For example, a programmable power supply may be included in the voltage controller 250. All or part of the voltage controller 250 can be built into the mechanical enclosure 240 or located outside of the mechanical enclosure 240.

FIG. 2B illustrates an optical switch 205 having two EC components 110 and 210. In some embodiments, EC components 110 and 210 are substantially the same. However, there can be differences between EC components 110 and 210 (e.g., different EC material 130 compositions) in other embodiments. Examples of various EC component materials and configurations that can be used are discussed in greater detail with respect to FIGS. 1A and 1B.

The optical switch 205 illustrated in FIG. 2B has, between EC components 110 and 210, an optical fiber 260 containing a fiber core 263 surrounded by cladding 266. The optical fiber 260 can be any length appropriate for its application, as can optical fibers 220 and 230. Additionally, one or more of the optical fibers 220, 230, 260, etc. can be a different length relative to another optical fiber 220, 230, 260, etc. The core 263 and cladding 266 of optical fiber 260 can be substantially similar to the cores 223 and 233 and claddings 226 and 236 of optical fibers 220 and 230. These components 223, 233, 226, and 236 are described in greater detail with respect to FIG. 2A. However, optical fiber 260 has two tips, which can each be substantially the same as the tips of optical fibers 220 and 230 (e.g., lensed tips of the same size). The cascading EC components 110 and 210 can be used to adjust the transmittance of optical switch 205.

For example, EC components 110 and 210 may each have 20% transmittance in their colored states. In these instances, optical switch 205 may have a lower total transmittance in its colored state than optical switch 200 because the second EC component 210 in switch 205 absorbs 80% of the light transmitted through the first EC component 110 (20%). It should be noted that this example, in which light is transmitted first through EC component 110 and then EC component 210, is for illustrative purposes and light transmission may occur in the opposite order. In some embodiments (not shown), the two EC components 110 and 210 can be positioned between optical fibers 220 and 230 while omitting the additional optical fiber 260. In these instances, the configurations of the EC components 110 and 210 and optical fibers 220 and 230 can be adjusted so that the distance between the tips of the optical fibers 220 and 230 does not exceed the maximum working distance of each optical fiber 220 and 230 (e.g., about 30 μm). Inclusion of the additional optical fiber 260 can reduce the distance between opposing optical fiber tips.

Optical switch 205 also has a mechanical enclosure 245, which can be substantially similar to mechanical enclosure 240 (FIG. 2A). However, mechanical enclosure 245 can be designed to immobilize and align more than one EC component 110 and 210 and more than two optical fibers 220, 230, and 260. Further, mechanical enclosure 245 can include additional circuitry connecting voltage controller 253 and the voltage source 113 to both of the EC components 110 and 210. The voltage controller 253 can be built into the mechanical enclosure 245 or located outside of the mechanical enclosure 245. Voltage controller 253 can be substantially similar to voltage controller 250 (FIG. 2A). For example, voltage controller 253 can receive and implement instructions to apply a voltage via voltage source 113 to one or both EC components 110 and 210. In optical switch 205, both EC components 110 and 210 have connectors (not shown) electrically connecting them to the voltage source 113. In some embodiments, optical switch 205 may have additional cascading EC components substantially similar to EC components 110 and 210 and additional optical fibers substantially similar to optical fiber 260.

Figure 3:
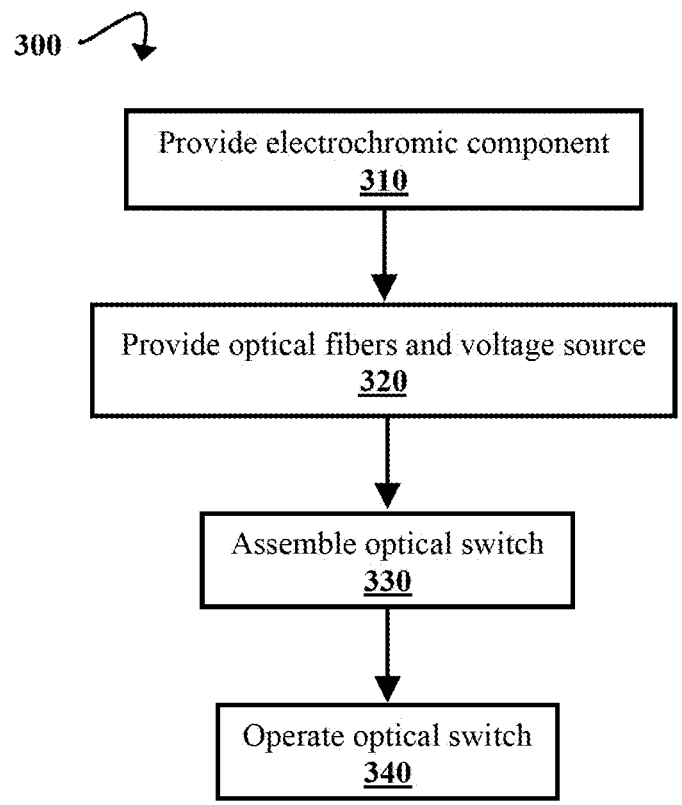
FIG. 3 is a flow diagram illustrating a process of forming an optical switch, according to some embodiments of the present disclosure.

FIG. 3 is a flow diagram illustrating a process 300 of assembling and operating an optical switch, according to some embodiments of the present disclosure. To illustrate this example, but not to limit embodiments, FIG. 3 is described within the context of the EC component 110 illustrated in FIGS. 1A and 1B and the optical switches illustrated in FIGS. 2A and 2B. Where elements shown in FIG. 3 are identical to elements shown in FIGS. 1A-2B, the same reference numbers are used in each Figure.

An electrochromic (EC) component is provided. This is illustrated at operation 310. The EC component can be the EC component 110 illustrated in FIGS. 1A and 1B. In some embodiments, the EC component 110 is an electrochromic glass. The EC component includes an EC material such as a transition metal oxide. Examples of EC component materials and configurations are discussed in greater detail with respect to FIG. 1A. In some embodiments, more than one EC component is provided (e.g., EC components 110 and 220). This is discussed in greater detail with respect to FIG. 2B.

Optical fibers and a voltage source are provided. This is illustrated at operation 320. For example, optical fibers with claddings surrounding fiber cores can be provided. The optical fibers can be surrounded by one or more protective (e.g., buffer) layers. The optical fibers can be optical fibers 220 and 230 (FIGS. 2A and 2B) and, optionally, optical fiber 260 (FIG. 2B). The voltage source 113 (FIGS. 1A-2B) can be any appropriate voltage source, such as an external power supply, an energy storage device, a programmable power supply, etc. For example, the voltage source 113 can be a DC power supply that can provide at least 0.5 V.

An optical switch is assembled. This is illustrated at operation 330. The optical switch can be an optical switch such as 200 or 205 (FIGS. 2A and 2B). The EC component can be positioned between tips of two optical fibers so that the distance between the tips does not exceed the maximum working distance of the optical fibers. In some embodiments, there can be more than one EC component (see FIG. 2B). The optical switch also includes connectors that form electrical connections between the EC component(s) and voltage source 113 (e.g., connectors 116 and 119 illustrated in FIGS. 1A and 1B). Additionally, a voltage controller can be incorporated into the optical switch (e.g., voltage controller 250 or 253 illustrated in FIGS. 2A and 2B).

The optical fiber tips and EC component(s) can be positioned within a mechanical enclosure (e.g., enclosure 240 or 245 illustrated in FIGS. 2A and 2B) that maintains alignment between the optical fibers and the EC component(s). The mechanical enclosure can also protect the interior components of the optical switch from their external environment (e.g., ambient light and debris). The optical fibers can be inserted into the mechanical enclosure via optical fiber connectors. The ends of the optical fibers opposite the tips incorporated into the optical switch can be connected to various units, depending on their applications. This is discussed in greater detail with respect to FIG. 2A.

The assembled optical switch can then be operated. This is illustrated at operation 340. The voltage controller can receive and carry out instructions for operating the optical switch. For example, the voltage controller can transition the EC component(s) between colored and bleached states based on input instructions to apply a voltage from the voltage source 113. An EC component substantially blocks light transmission in its colored state and allows light transmission in its bleached state. For example, the EC component may block about 75-99% of light transmission from one optical fiber to the other in its colored state and about 1-25% of light transmission in its bleached state. The instructions can specify when to turn the optical switch on (bleached state) and off (colored state). The instructions can also specify a voltage level and polarity. Applications in which the optical switch can be operated may include fiber optic telecommunications, fiber lasers, optical computing, etc.

The shapes and sizes of the components of diagrams 100, 105, 200, and 205 are for illustrative purposes, and it should be understood that the components of these diagrams can be any size, shape, or scale appropriate for their application. The EC component 110 of FIGS. 1A and 1B and the optical switches 200 and 205 of FIGS. 2A and 2B can also include various components that are not illustrated herein. Additionally, illustrated components may be omitted in some embodiments.

Unless otherwise noted, ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g") and, in connection with a list of ranges, applies to each range in the list (e.g., "about 1 g-5 g, 5 g-10 g, etc." should be interpreted as "about 1 g-about 5 g, about 5 g-about 10 g, etc."). Unless otherwise indicated, modifying terms such as "about," "approximately," and "~" indicate ±10% of a recited value, range of values, or endpoints of one or more ranges of values.

The processes discussed herein, and their accompanying drawings, are not to be construed as limiting. One skilled in the art would recognize that a variety of techniques may be used that vary in conditions, components, methods, etc., which ultimately result in optical switches that use electrochromic materials. In addition, the conditions can optionally be changed over the course of a process. Further, in some embodiments processes can be added, omitted, or carried out in alternate orders (e.g., reversing operations 310 and 320 of process 300 illustrated in FIG. 3), while still remaining within the scope of the disclosure, as will be understood by a person of ordinary skill in the art. It should also be noted that processes can be carried out by a single entity, or by multiple entities. For example, a first entity may prepare an EC component, and a second entity may prepare an optical switch containing the EC component.

What is claimed is:

1. A device, comprising:
   an optical transistor comprising:
      a first optical fiber;
      a second optical fiber optically aligned with the first optical fiber;
      at least two electrochromic components optically aligned with the first and second optical fibers, wherein:
         the at least two electrochromic components comprise a first electrochromic component positioned in a first space, wherein the first space is between a tip of the first optical fiber and a tip of the second optical fiber and has a width not exceeding a maximum working distance of the tip of the first optical fiber; and
         the at least two electrochromic components have colored states with light transmittances that, in combination, are able to block light transmission between the first and second optical fibers; and
      a voltage source configured to cause the at least two electrochromic components to selectively switch between the colored states and bleached states to respectively block or allow signal transmission from the first optical fiber to the second optical fiber.

2. The device of claim 1, wherein:
   the optical transistor further comprises a third optical fiber; and
   the at least two electrochromic components further comprise a second electrochromic component positioned in a second space, wherein the second space is between a second tip of the second optical fiber and a tip of the third optical fiber and has a width not exceeding a maximum working distance of the second tip of the second optical fiber.

3. The device of claim 1, wherein the first optical fiber and the second optical fiber are multi-mode optical fibers.

4. The device of claim 1, wherein the first electrochromic component comprises:
   a first transparent conductive layer in contact with an electrochromic layer;
   an ion transport layer in contact with the electrochromic layer and a counterelectrode; and
   a second transparent conductive layer in contact with the counterelectrode.

5. The device of claim 4, wherein the electrochromic layer comprises a transition metal oxide.

6. The device of claim 5, wherein the transition metal oxide is anhydrous tungsten oxide or a tungsten oxide hydrate.

7. The device of claim 1, further comprising a mechanical enclosure.

8. A method comprising:
   providing at least two electrochromic components, wherein the at least two electrochromic components have colored states with light transmittances that, in combination, are able to block light transmission between optical fibers;
   providing a first optical fiber aligned with a second optical fiber;
   providing at least one voltage source; and
   assembling an optical transistor that includes the at least two electrochromic components, the first optical fiber, and the second optical fiber, wherein, in the assembled optical transistor:
      a first electrochromic component of the at least two electrochromic components is positioned in a first space, wherein the first space is between a tip of the first optical fiber and a tip of the second optical fiber and has a width not exceeding a maximum working distance of the tip of the first optical fiber;
      the at least two electrochromic components are connected to the at least one voltage source; and
      the at least one voltage source is configured to cause the at least two electrochromic components to selectively switch between the colored states and bleached states to respectively block or allow signal transmission from the first optical fiber to the second optical fiber.

9. The method of claim 8, wherein the providing the at least two electrochromic components comprises providing an electrochromic transition metal oxide.

10. The method of claim 8, wherein the providing the at least two electrochromic components comprises forming a nanosheet of a transition metal oxide.

11. The method of claim 8, wherein the providing the at least two electrochromic components comprises forming a thin film of a transition metal oxide.

12. An article of manufacture, comprising:
   an optical transistor, comprising:
      a first optical fiber;
      a second optical fiber optically aligned with the first optical fiber;

at least two electrochromic components optically aligned with the first and second optical fibers, wherein:
the at least two electrochromic components comprise a first electrochromic component positioned in a first space, wherein the first space is between a tip of the first optical fiber and a tip of the second optical fiber and has a width not exceeding a maximum working distance of the tip of the first optical fiber; and
the at least two electrochromic components have colored states with light transmittances that, in combination, are able to block light transmission between the first and second optical fibers; and
a voltage source configured to cause the electrochromic component to selectively switch between the colored states and bleached states to respectively block or allow signal transmission from the first optical fiber to the the second optical fiber.

13. The article of manufacture of claim 12, wherein:
the optical transistor further comprises a third optical fiber; and
the at least two electrochromic components further comprise a second electrochromic component positioned in a second space, wherein the second space is between a second tip of the second optical fiber and a tip of the third optical fiber and has a width not exceeding a maximum working distance of the second tip of the second optical fiber.

14. The article of manufacture of claim 12, wherein the first electrochromic component comprises a transition metal oxide.

15. The device of claim 2, wherein the first electrochromic component and the second electrochromic component have different percent transmittances in response to applied voltages.

16. The device of claim 1, wherein the maximum working distance of the tip of the first optical fiber is 30 μm.

17. The device of claim 1, wherein the first electrochromic component comprises a two-dimensional nanosheet of a transition metal oxide.

18. The device of claim 1, wherein the first electrochromic component is a flexible electrochromic component comprising:
a conductive layer comprising indium tin oxide (ITO) on polyethylene terephthalate; and
a two-dimensional electrochromic nanosheet in contact with the conductive layer.

19. The device of claim 1, wherein the at least two electrochromic components further comprise a second electrochromic component located in the first space.

20. The device of claim 2, wherein the first electrochromic component, the second optical fiber, and the second electrochromic component are inside a mechanical enclosure.

* * * * *